United States Patent
Ansari et al.

(10) Patent No.: US 9,258,361 B2
(45) Date of Patent: Feb. 9, 2016

(54) TRANSFERRING DATA AMONG NODES ON A NETWORK

(75) Inventors: Nirwan Ansari, Montville, NJ (US); Nan Wang, Eatontown, NJ (US)

(73) Assignee: NEW JERSEY INSTITUTE OF TECHNOLOGY, Newark, NJ (US)

(*) Notice: Subject to any disclaimer, the term of this patent is extended or adjusted under 35 U.S.C. 154(b) by 399 days.

(21) Appl. No.: 12/420,724

(22) Filed: Apr. 8, 2009

(65) Prior Publication Data
US 2010/0260189 A1 Oct. 14, 2010

(51) Int. Cl.
*H04L 12/28* (2006.01)
*H04L 29/08* (2006.01)

(52) U.S. Cl.
CPC .............. *H04L 67/104* (2013.01); *H04L 67/06* (2013.01); *H04L 67/108* (2013.01)

(58) Field of Classification Search
CPC ... H04L 67/104; H04L 67/1076; H04L 67/06; H04L 47/14; H03M 13/3761; H04W 40/02; H04W 84/18
USPC .................................. 370/252, 400; 709/246
See application file for complete search history.

(56) References Cited

U.S. PATENT DOCUMENTS

| | | | |
|---|---|---|---|
| 5,784,358 A | 7/1998 | Smith et al. | |
| 6,633,579 B1 | 10/2003 | Tedijanto et al. | |
| 6,937,678 B2 | 8/2005 | Abel | |
| 7,340,505 B2 | 3/2008 | Lisiecki et al. | |
| 7,483,374 B2 | 1/2009 | Nilakantan et al. | |
| 7,724,636 B2 | 5/2010 | Tseng et al. | |
| 7,808,913 B2 | 10/2010 | Ansari et al. | |
| 7,948,881 B2 | 5/2011 | Alharbi et al. | |
| 7,969,881 B2 | 6/2011 | Ansari et al. | |
| 2006/0020560 A1* | 1/2006 | Rodriguez et al. | 705/75 |
| 2006/0149753 A1* | 7/2006 | Medard et al. | 707/100 |
| 2007/0268828 A1 | 11/2007 | Peng | |
| 2008/0320104 A1* | 12/2008 | Turner et al. | 709/219 |
| 2009/0143872 A1 | 6/2009 | Thiele et al. | |
| 2009/0198825 A1* | 8/2009 | Miller et al. | 709/230 |
| 2009/0248898 A1* | 10/2009 | Gkantsidis et al. | 709/246 |
| 2010/0128605 A1 | 5/2010 | Chavan et al. | |
| 2011/0026426 A1* | 2/2011 | Kirisawa | 370/252 |
| 2011/0026429 A1 | 2/2011 | Slimane et al. | |
| 2011/0087799 A1 | 4/2011 | Padhye et al. | |

OTHER PUBLICATIONS

"QCN pseudo-code version 2.0," Definition—Variables, retrieved at http://www.ieee802.org/1/files/public/docsw2008/au-rong-qcn-serial-hai-pseudo-code%20rev2.0.pdf, pp. 8.

"Series G: Transmission Systems and Media, Digital Systems and Networks," International Telecommunication Union, Broadband optical access systems based on Passive Optical Networks (PON), ITU-T Recommendation G.983.1, pp. 60 (2005).

(Continued)

*Primary Examiner* — Brian O'Connor
*Assistant Examiner* — Lionel Preval
(74) *Attorney, Agent, or Firm* — Turk IP Law, LLC

(57) ABSTRACT

Techniques for transferring data among nodes on a network are disclosed. Some example methods include a downloader-initiated random linear network coding algorithm. A downloading node may be aware of the chunks of original data held by neighboring nodes, and the downloading node can request linear combinations of chunks from the neighboring nodes that are linearly independent of any linear combinations of chunks already held by the downloading node.

20 Claims, 10 Drawing Sheets

(56) References Cited

OTHER PUBLICATIONS

"Series G: Transmission Systems and Media, Digital Systems and Networks," International Telecommunication Union, Gigabite-capable passive optical networks (PON), ITU-T Recommendation G.984.1, pp. 22 (2003).

Assi, C.M., et al., "Dynamic Bandwidth Allocation for Quality-of-Service Over Ethernet PONs," IEEE Journal on Areas in Communications, vol. 21, No. 9, pp. 1467-1477 (2003).

Banerjee, A., et al., "Fair Sharing Using Dual Service-Level Agreements to Achieve Open Access in a Passive Optical Network," IEEE Journal on Selected Areas in Communications, vol. 24, No. 8, pp. 32-44 (2006).

Banerjee, A., et al., et al., "Wavelength-division-multiplexed passive optical network (WDM-PON) technologies for broadband access: a review [Invited]," Journal of Optical Networking, pp. 737-758, vol. 4, No. 11, Optical Society of America (2005).

Bergamasco, D. "Data Center Ethernet Congestion Management: Backward Congestion Notification," in IEEE 802.1 Interim Meeting, Berlin, Germany, pp. 1-25 (2005).

Bubnicki Z.., "Modern Control Theory," pp. 55-60, Spring (2005).

Byun, H-J., et al., "Dynamic bandwidth allocation algorithm in Ethernet passive optical networks," IEEE Electronic Letters, vol. 39, No. 13, pp. 1001-1002 (2003).

Gummalla, A., et al., "MPCP—State of the Art," IEEE 802.3ah, Interim, Raleigh NC, pp. 1-5 (Jan. 2002).

Hellerstein, J. L. et al., "Feedback Control of Computing Systems," Chapter 10, pp. 337-374, Wiley-Interscience (2004).

Hollot, C.V., et al., "A Control of Theoretic Analysis of RED," IEEE Twentieth Annual Joint Conference of the IEEE Computer and Communications Societies, Proceedings, vol. 3, pp. 1510-1519 (2001).

Kim K. Y., et al., "Optimal rate based flow control for ABR services in ATM Networks," Poceedings of the IEEE Region, 10, vol, 1, pp, 773-776 (1999).

Kramer, G., et al., "IPACT: A Dynamic Protocol for an Ethernet PON (EPON)," IEEE Communications Magazine, vol. 40, No. 2, pp. 74-80 (2002).

Luo, Y., and Ansari, N., "Bandwidth allocation for multiservice access on EPONs," IEEE Optical Communications,vol. 43, Issue 2, pp. S16-321 (2005).

Luo, Y., and Ansari, N., et al "Limited sharing with traffic prediction for dynamic bandwidth allocation and QoS provisioning over Ethernet passive optical networks," Journal of Optical Networking, vol. 4, No. 9, pp. 561-572, Optical Society of America (2005).

Luo, Y., et al., "Resource Management for Broadband Access over Time-Division Multiplexed Passive Optical Networks," IEEE Network, Vol, 21, Issue 5, pp. 20-27, IEEE (2007).

Ma, M., et al., "A Bandwidth Guaranteed Polling MAC Protocol for Ethernet Passive Optical Networks,"Twenty-Second Annual Joint Conference of the IEEE Computer and Communications. IEEE Societies, vol. 1, pp. 22-31 (2003).

Naser, H., and Mouftah, H.T., "A Joint-ONU interval-based dynamic scheduling algorithm for Ethernet passive optical networks," IEEE/ACM Transactions on Networking, vol. 14, No. 4, pp. 889-899 (2006).

Shami, A., et al., "Jitter Performance in Ethernet Passive Optical Networks," Journal of Lightwave Technology, vol, 23, No. 4, pp. 1745-1753 (2005).

Sherif, S,R., et al., "A Novel Decentralized Ethernet-Based PON Access Architecture for Provisioning Differentiated QoS," Journal of Lightwave Technology, vol. 22, No. 11, pp. 2483-2497 (2004).

So-In, C., "Enhanced Forward Explicit Congestion Notification (E-FECN) Scheme for Datacenter Ethernet Networks," International Symposium on Performance Evaluation of Computer and Telecommunication Systems (SPECTS'08), pp. 542-546 (2008).

Wang, N., "Downloader-Initiated Random Linear Network Coding for Peer-to-Peer File Sharing," IEEE System Journal, vol. 5, Issue 1, pp, 61-69 (2011).

Willinger, W., et al., "Self-Similarity Through High-Variability: Statistical Analysis of Ethernet LAN Traffic at the Source Level," IEEE/ACM Transactions on Networking, vol. 5, Issue 1, pp. 71-86, IEEE (1997).

Yin, S., et al., "NXG02-3: Bandwidth Allocation over EPONs: A Controllability Perspective," Global Telecommunications Conference, pp. 1-5, IEEE (2006.

Yin, S., et al., "Stability of Predictor Based Dynamic Bandwidth Allocation over EPONs," IEEE Communications Letters, vol. 11, No. 6, pp. 549-551, IEEE (2007).

Zhang, L., et al., "Dual DEB-GPS scheduler for delay-constraint applications in Ethernet passive optical networks," IEICE Transactions on Communications, vol. E86-B, No. 5. pp. 1575-1584 (2003).

Zhang, Y., and Ansari, N., "On Mitigating TCP Incest in Data Center Networks," Proceedings IEEE IINFOCOM, pp. 1-9 (2011).

Kramer, G., et al., "Ethernet PON (ePON): Design and Analysis of an Optical Access Network," Photonic Network, Communications, vol. 3, Issue 3, pp. 307-319, Kluwer Academic Publishers (2001).

Ahlswede, et al., "Network information flow," IEEE Transactions on Information Theory, Jul. 2000, pp. 1204-1216, vol. 46, IEEE, New York City, New York, USA.

Li, et al., "Linear network coding," IEEE Transactions on Information Theory, Feb. 2003, pp. 371-381, vol. 49, IEEE, New York City, New York, USA.

Fragouli et al., "Wireless Network Coding: Opportunities & Challenges", Military Communications Conference, MILCOM 2007, 2007, pp. 1-8, IEEE, New York City, New York, USA. [Month of publication is unknown. The year of publication is sufficiently earlier than the effective U.S. filed and any foreign priority date so the particular month of publication is not in issue.].

Gkantsidis, et al., Network coding for large scale content distribution, IEEE Infocom, 2005, pp. 2235-2245, vol. 4, Miami, FL, USA. [Month of publication is unknown. The year of publication is sufficiently earlier than the effective U.S. filed and any foreign priority date so the particular month of publication is not in issue.].

Avalanche: File Swarming with Network Coding, http://research.microsoft.com/en-us/projects/avalanche/defaultaspx. [Retrieved from Internet on Mar. 27, 2012.].

Chiu, et al., "Can Network Coding Help in P2P Networks?" Modeling and Optimization in Mobile, Ad Hoc and Wireless Networks, Second Workshop of Network Coding (NetCod 2006), in conjunction with WiOpt 2006, Apr. 2006, pp. 1-5, Boston, MA, USA.

Qiu, et al., "Modeling and performance analysis of BitTorrent-like peer-to-peer networks." Proceedings of the 2004 conference on Applications, technologies, architectures, and protocols for computer communications, ACM Sigcomm, Aug. 30-Sep. 3, 2004, pp. 367-378, Portland, Oregon, USA.

Gkantsidis, et al., "Anatomy of a P2P Content Distribution System with Network Coding", IPTPS'06, Feb. 2006, 6 pages, Santa Barbara, CA USA.

C. Gkantsidis, J. Miller, P. Rodriguez, "Comprehensive view of a Live Network Coding P2P system", Proceedings of the 6th ACM SIGCOMM conference on Internet measurement, Oct. 2006, pp. 177-188, Rio de Janeiro, Brazil.

Legout, et al., "Rarest first and choke algorithms are enough." Proceedings of the 6th ACM SIGCOMM Internet Measurement Conference, IMC, Oct. 2006, pp. 203-216, Rio de Janeiro, Brazil.

Fonseca, et al., BitTorrent Protocol—BTP/1.0, Apr. 2005, http://jonas.nitro.dk/bittorrent/bittorrent-rfc.html. [Retrieved from Internet on Mar. 27, 2012.].

Ansari, N., and Luo, Y., "Passive Optical Networks for Broadband Access," the Handbook of Computer Networks, Data Transmission and Digital and Optical Networks, vol. 1, Hossein Ridgoli., eds., pp. 948-957, John Wiley & Son (2011).

IEEE Computer Society, Part 3: Carrier Sense Multiple Access with Collision Detection (CSMAICD) Access Method and Physical Layer Specifications, IEEE-SA Standards Board, 2004.

"Ethernet flow control," accessed at http://web.archive.org/web/20090312005805./http://en.wikipedia.org/wiki/ Ethernet_flow_control, last modified on Feb. 16, 2009, pp. 1-2.

(56) References Cited

OTHER PUBLICATIONS

Alizadekm., et al., "Data Center Transport Mechanisms: Congestion Control Theory and IEEE Standardization," Forty-Sixth Annual Allerton Conference, Allerton House, UIUC, Illinois, USA, pp. 1270-1277 (Sep. 23-26, 2008).

Bergamasco, D., and Pan, R., "Backward Congestion Notification Version 2.0," in IEEE 802.1 Meeting, pp. 1-39, (Sep. 2005).

Chen, Y., et al., "Understanding TCP incast throughput collapse in datacenter networks," WREN'09, Barcelona, pp. 73-82 (Aug. 21, 2009) Spain, pp. 73-82 (Aug. 21, 2009).

Dean, J., et al., "MapReduce: simplified data processing on large dusters," Commun, ACM, vol. 51, No. 1, pp. 1-13 (2008.)

Ghemawat, S., et al., "The google file system," SOSP'03, Bolton Landing, New York, USA, pp. 1-15 (Oct. 19-22, 2003).

Gur, G., et al., "Exploring the Issues in Policy-Based Approaches for QoS Support in 3G+ Mobile Networks," Second IFIP International Conference on Wireless and Optical Communications Networks, 2005. WOCN 2005, pp. 260-364 (Mar. 6-8, 2005).

Jiang, J., et al., "An Explicit Rate Control Framework for Lossiess Etherent Operation," in International Conference Department of Computer Science and Engineering, pp. 5914-5918 (May 19-23, 2008).

Jiang, J., et al., "Analysis of Backward Congestion Notification (BCN) for Ethernet in Datacenter Applications," Department of Computer Science and Engineering, Washington University in Saint Louis, pp, 1-10 (2007).

Kabbani, A., et al., "AF-QCN: Approximate Fairness with Quantized Congestion Notification for Multi-tenanted Data Centers," System IP Core Research Laboratories, NEC Coporation, Japan, Cisco Systems, San Jose, California, 2010 18th IEEE Symposium on High Performance Interconnects, pp. 58-65 (2010).

Nagle, D., et al., "The Panasas ActiveScale Storaae Cluster: Delivering Scalable High Bandvvidth Storage," in SC'04: Proceedings of the 2004 ACM/IEEE conference on Supercomputing, Washington DC, USA, pp. 1-10 (Nov. 6-12 2004).

Phanishayee, A., et al., "Measurement and analysis of TCP throughput collapse in cluster-based storage systems," Parallel Carnegie Mellon University, CMU-PDL-07-1 05, Sep. 2007Data Laboratory Carnegie Mellon University Pittsburgh, PA 15213-3890, pp. 1-16 (Sep. 2007).

So-In, C,, et al., "Enhanced Forward Explicit Congestion Notification (E-Fecn) Scheme for Datacenter Ethernet Networks," Department of Computer Science and Engineering, Washington University in St. Louis, pp. 1-5 (2008).

Vasudevan et al "Safe and effective fine-grained TCP retransmissions for datacenter communication," SIGCOMM'09, Barcelona, Spain, pp. 303-314 (Aug. 17-21, 2009).

Vishwanath, A., et al., "Perspectives on router buffer sizing: recent results and open problems," ACM SIGCOMM Communication Review, vol. 39, No. 2, pp. 34-39 (Apr. 2009).

\* cited by examiner transmitting, by a first node to at least one neighbor node, a coefficient matrix including coefficient vectors corresponding to linear combinations of chunks previously received by the first node

208 receiving, by the first node, from the neighbor node, a request corresponding to a desired linear combination of chunks corresponding to a linear combination of coefficient vectors in the first node's coefficient matrix

210 transmitting, from the first node to the second node, the desired linear combination of chunks

212

FIG. 8 transmitting, by a first node to a second node, a coefficient matrix including a plurality of coefficient vectors associated with chunks of an original data held by the first node
↓ 220 identifying, by the second node, a desired linear combination by randomly selecting from among a plurality of linear combinations of coefficient vectors in the coefficient matrix that are linearly independent from the vectors in the coefficient matrix of the second node
↓ 222 requesting, by the second node, that the first node transmit the chunks associated with the desired linear combination
↓ 224 transmitting, by the first node to the second node, the chunks associated with the desired linear combination and a coefficient vector associated with the desired linear combination
226

FIG. 9

TRANSFERRING DATA AMONG NODES ON A NETWORK

TECHNICAL FIELD

The present disclosure generally relates to transferring data among nodes on a network and, more particularly, to network coding in peer-to-peer networks.

BACKGROUND

In some networks, when information is sent from a source node to the destination node, the intermediate nodes (if any) along the transmission route may simply forward the information to the next node along the path: they may not alter the information or impose any coding on the information. In some networks employing network coding, intermediate nodes may apply coding on the information they are forwarding. In some networks employing network coding, the outgoing message(s) from an intermediate node may be different from the incoming message(s) at that intermediate node.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIG. 8 is a flowchart depicting the operation of an example downloader-initiated random linear network coding method;

FIG. 9 is a flowchart depicting the operation of an example downloader-initiated random linear network coding method.

DETAILED DESCRIPTION

Figure 1:
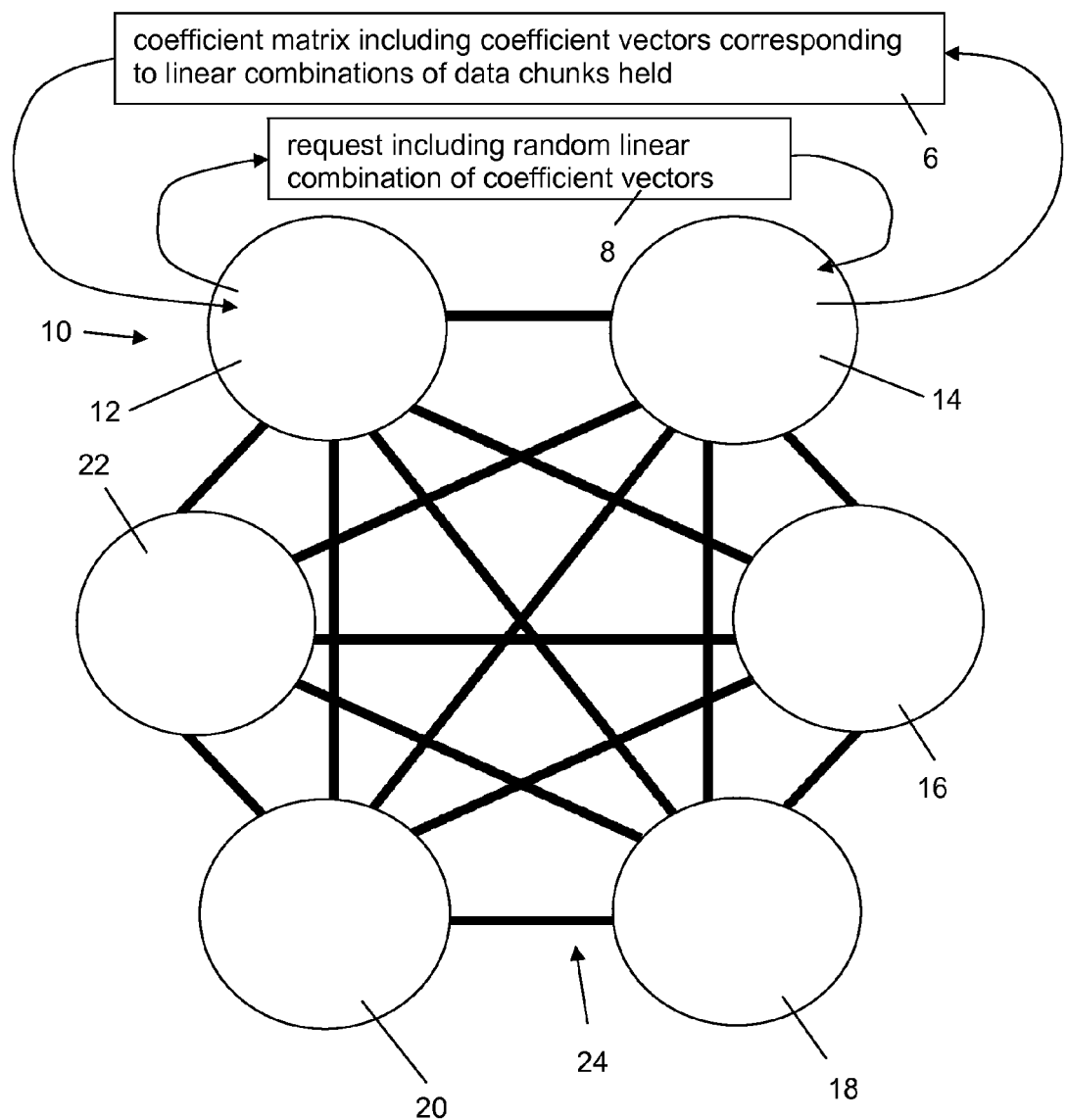
FIG. 1 is a schematic diagram of an example peer-to-peer network including messaging between related to an example downloader-initiated random linear network coding method.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

This disclosure is drawn, inter alia, to methods, apparatus, computer programs, and systems related to peer-to-peer ("P2P") file sharing. This disclosure includes an example downloader-initiated random linear network coding scheme for P2P file sharing.

Described herein is an example algorithm, referred to as a downloader-initiated random linear network coding algorithm ("DRLNC"), which may let a downloader determine the random linear coding. As discussed in greater detail below, an example DRLNC algorithm may eliminate or reduce the "unlucky combination" problem faced by control network coding, and, therefore, may further improves the performance of P2P networks. Such further improvement may be particularly advantageous in a wireless environment where bandwidth may be an especially limited resource. In example embodiments, the DRLNC algorithm may reduce the number of uploads by the originating node and may distribute the upload burden more evenly among the peers.

Some example embodiments include methods of network coding on a network, such as a peer-to-peer network. Some example methods include a downloader-initiated random linear network coding algorithm. In some example methods, a downloading node may be aware of the chunks of original data held by neighboring nodes, and the downloading node may request randomly selected linear combinations of chunks from the neighboring nodes that may be linearly independent of linear combinations of chunks already held by the downloading node.

FIG. 1 is a schematic diagram of an example peer-to-peer network including messaging between related to an example downloader-initiated random linear network coding method in accordance with at least some embodiments of the present disclosure. As illustrated, example P2P network 10, includes nodes 12, 14, 16, 18, 20, 22 interconnected by data connections 24. Messages 6, 8 are representative of example communications between nodes 12, 14, 16, 18, 20, 22 for downloader-initiated random linear network coding.

As discussed in greater detail below, a P2P network 10 may be used to transfer data between nodes 12, 14, 16, 18, 20, 22 across data connections 24. In an example downloader-initiated random linear network coding method, message 6 (including a coefficient matrix including coefficient vectors corresponding to linear combinations of data chunks held by node 14) may be transmitted from node 14 to node 12. Also as discussed in greater detailed below, node 12 may transmit message 8 (including a request including a random linear combination of coefficient vectors) to node 14. In response, node 14 may transmit the data requested by node 12.

For example and without limitation, the data connections 24 between various nodes 12, 14, 16, 18, 20, 22 may be wired or wireless, may utilize any networking technology, and may be geographically spaced apart or may be co-located. It will be understood that the connections 24 depicted in FIG. 1 are conceptual in that they represent the ability of the nodes 12, 14, 16, 18, 20, 22 to communicate with other nodes 12, 14, 16,

18, 20, 22; unique, individual physical connections between individual nodes 12, 14, 16, 18, 20, 22 are typically not required.

As used herein, "source node" may refer to the node that contains the entire original data to be distributed (also referred to as a "seeder" in some protocols). As used herein, "original data" may refer to the entire file or bundle of files that are to be obtained by other nodes. As used herein, "upload" may refer to the action of transferring a piece of data a node already has to another node. In some cases, a node performing an upload may not increase the amount of its local data. As used herein, "download" may refer to the action of receiving a piece of data from one or more other nodes. In some cases, a node performing a download may increase the amount of its local data. As used herein, "downloader" may refer to the node that is the receiving end during a data transmission. As used herein, "uploader" may refer to the node that is the sending end during a data transmission. As used herein, "downloading nodes" may refer to the nodes which attempt to obtain the original data (also referred to as "leechers" in some protocols). As used herein, "uploading nodes" may refer to the nodes that are uploading part of the original data to other downloading nodes. Note that, in some cases, any node in a P2P file sharing network can potentially be an uploading node. As used herein, "upload-complete" may refer to the situation when the information that has been uploaded from the source node is sufficient to reconstruct the original data. Theoretically, when upload-complete is reached, the source node may no longer have to upload any more information; instead, the downloading nodes can exchange information among themselves to obtain the complete original data.

Figure 2:
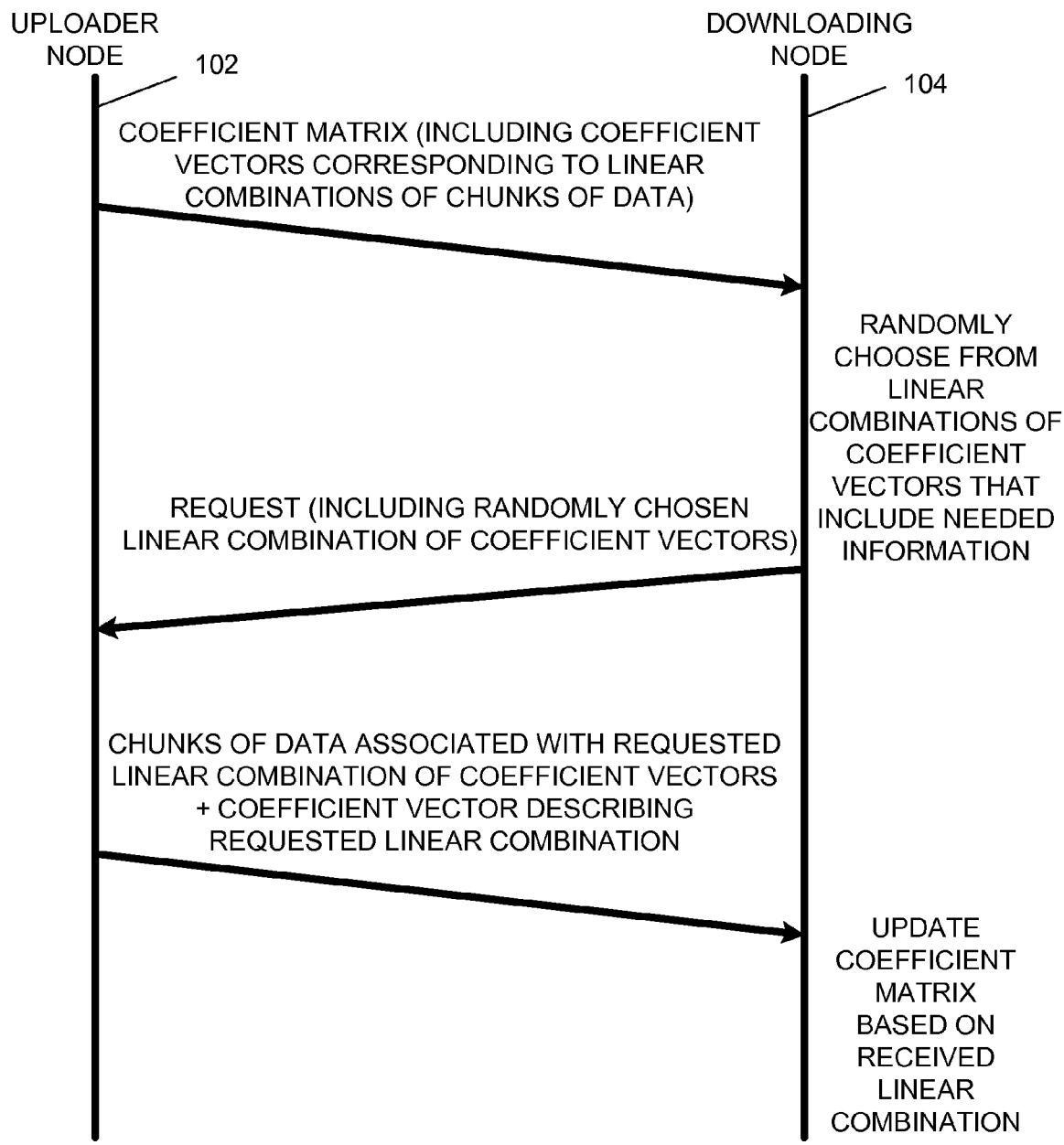
FIG. 2 is a signal flow diagram depicting an example downloader-initiated random linear network coding method.

FIG. 2 is a signal flow diagram depicting an example downloader-initiated random linear network coding method in accordance with the present disclosure. An example exchange between an uploader node 102 and a downloading node 104 on a P2P network is illustrated. While FIG. 2 depicts an exchange between a pair of nodes, the present disclosure is not so limited and many such exchanges may occur between many nodes in a network. In addition, any given node may function as both an uploading node and a downloading node in different transactions.

In an example exchange, the uploader node 102 may notify other nodes, including downloading node 104, which chunks of the original data it holds by transmitting a coefficient matrix including coefficient vectors corresponding to linear combinations of chunks of the original data. The downloading node 104 may randomly choose a linear combination of coefficient vectors from among those linear combinations of the coefficient vectors that include information utilized to acquire the complete original data. The downloading node 104 may send a request to the uploader node 102 including the randomly chosen linear combination of coefficient vectors. In response, the uploader node 102 may transmit the chunks of data associated with the requested linear combination of coefficient vectors. In addition, the uploader node 102 may transmit a coefficient vector describing the requested linear combination. The downloading node 104 may update its own coefficient matrix to reflect the received data.

The present disclosure contemplates that network coding has been studied for various networking applications. A notable difference between control networks and those with network coding is that, in control networks, when information is sent from a source node to a destination node, intermediate nodes (if any) along the transmission route may simply forward the information to the next node along the path; they may not alter the information nor impose any coding on this information. In contrast, in networks utilizing network coding, the intermediate nodes may be allowed to apply coding on the information they are forwarding. This means that outgoing message(s) can be different from the incoming message(s) at any given intermediate node.

The present disclosure contemplates that network coding may improve the overall efficiency in multicast (a network addressing method for the delivery of information to a group of destinations simultaneously using an efficient strategy to deliver the messages over an individual link of the network only once, creating copies only when the links to the multiple destinations split, typically network switches and routers, which is often used for streaming media and Internet television applications) in a wired network, and it has been shown to increase throughput in a wireless network. Network coding also may be beneficial in P2P file sharing networks. Because one purpose of a file sharing network may be to distribute a single digital file residing on one computer to multiple computers, a P2P network may be viewed as a multicast network. Thus, network coding may improve the efficiency of a P2P file sharing network.

The example mathematical analysis discussed below furthers the study of network coding in P2P networks. The example mathematical model discussed below indicates that network coding improves the performance of P2P networks.

The present disclosure contemplates that, in some cases, one purpose of a file sharing network may be, for a given node in the network, to distribute a single file or a bundle of files residing in the given node to other nodes in the network that are interested in obtaining such file(s). The process of distributing data from a source node to a downloading node can be accomplished based at least in part on a client-server protocol, such as FTP. However, a drawback of client-server protocols may be the lack of scalability: each time a downloading node requests the original data, the source node may have to upload the entire file(s).

The present disclosure contemplates that, for example, if the original data has a size of D and there are n downloading nodes, the source may upload $D \times n$ of data using its upload link. Therefore, when n becomes large, the source node's network resource (e.g., upload capacity) may be exhausted. This may be a notable problem, particularly in a wireless P2P network where bandwidth may be a precious resource. As a result, the average downloading time may increase as the downloading nodes wait for connections to the source node.

The present disclosure contemplates that, in some cases, P2P file sharing networks may be used to solve the scalability problem encountered in the client-server mode. The P2P network's basic approach may be to allow downloading nodes (which would be clients in FTP) to behave as uploading nodes (which would be servers in FTP) as well. In some cases, a node can distribute any part of the original data it holds to any other nodes that have not obtained that part yet. Ideally, in such a scheme, the source node may only need to upload the original data once, e.g., $D \times 1$, and then the rest of the downloading nodes can distribute the data among themselves until the downloading nodes have obtained the entire original data.

The present disclosure contemplates that, in some P2P file sharing networks without network coding, the original data to be distributed is divided into a number of smaller pieces (which may be equal in size or substantially equal in size), referred to herein as "chunks." Each time an upload or download occurs, a chunk may be sent from one node to another node. In some cases, nodes may attempt to download the chunks that they do not have, and nodes may upload the chunks they have to other nodes when requested. When a downloading node has collected all of the chunks making up the original data, the node can then reconstruct the original data. Any node can leave the network at any given time, either before or after it receives the complete original data. While many P2P file sharing networks may include these and other characteristics, each of these characteristics may or may not be included in example embodiments described herein.

The present disclosure contemplates that P2P file sharing network with network coding may operate in a similar manner to a P2P file sharing network without network coding. However, in example P2P file sharing networks with network coding, instead of uploading a specific chunk of the original data each time, a node may upload a "linear combination" including one or more chunks to the downloading nodes along with the "coefficient" of this linear combination.

The present disclosure contemplates that when a node receives enough linearly independent combinations, it may be able to reconstruct the original data. At first glance, this approach may appear to add extra overhead in transmission—the "coefficient" information. However, the extra overhead may improve the overall efficiency of the P2P file sharing network and may overcome some obstacles encountered by some P2P file sharing networks.

The present disclosure contemplates that, in some cases, to achieve a desired efficiency, it may be desired that the downloading nodes will download chunks from the source node—and later on from each other—in a cooperative manner. For example, a network may include one source node S and ten downloading nodes ($n_1$ to $n_{10}$). The original data may be divided into ten chunks ($k_1$ to $k_{10}$). In such a network, the total uploads may equal the total downloads. Therefore, when there are 10 downloading nodes attempting to acquire the ten-chunk original data, the total downloads that may be needed is 10×10=100 chunks. It may be desirable for the burden of providing these 100 chunks worth of downloads to be evenly or nearly evenly shared among the nodes. In such a situation, the source node may need only to provide ten chunks of uploads, and the remaining ten nodes may upload 9 chunks each. Thus, 10×1+9×10=100 chunks.

The present disclosure contemplates that, to improve efficiency, nodes may avoid downloading the same chunks as their peers. Therefore, some P2P networks may employ a "rarest-first" algorithm, which may cause the nodes to download the chunks that currently reside in the fewest nodes first. Such a system typically may call for downloading nodes to be aware of which chunks other nodes currently have.

The present disclosure contemplates that, if the nodes have this information from the other nodes, a "global-rarest-first" algorithm can be utilized. However, owing to the large numbers of nodes in some P2P networks, it may be impossible or impractical for the nodes to be aware of the information of all other nodes. Therefore, some P2P networks use a "local-rarest-first" algorithm instead. In a local-rarest-first system, an individual node may be aware of a limited number of other peer nodes, which are referred to as its "neighbor nodes." When a node is requesting a download, it may look for the chunk that resides in the fewest nodes within its neighborhood. However, even though local-rarest-first system may be a reasonable alternative to a global-rarest-first system when global information is not universally available, the overall efficiency of such a local-rarest-first network may be less than that of a global-rarest-first network because it may be less likely that the of the nodes will act cooperatively.

The present disclosure contemplates that even global-rarest-first algorithm in a P2P network has limitations. For example, when two chunks are both the rarest chunks at a given moment, and there are two nodes attempting to download these chunks, the algorithm may not prevent the two nodes from selecting the same chunk to download. Implementing network coding in a P2P network may solve this kind of problem.

The present disclosure contemplates that, to analyze how much network coding can improve the performance of a P2P network, a simple example situation may be considered where:
1. The original data is divided into k chunks, $k_1, k_2, \ldots, k_k$.
2. There is one node with the original data (e.g., there is one source node).
3. There are n nodes participating in the download (e.g., there are n downloading nodes).
4. The nodes are aware of the states of other nodes. This means the global-rarest-first algorithm may be possible in some P2P networks.
5. There can be C simultaneous uploads from a node.
6. The network is homogeneous; that is, the amount of time utilized to download a chunk is the same for the individual nodes.

The present disclosure contemplates that, to evaluate the performance of the example P2P network under these conditions, how many "rounds" of uploads the source node has to perform until the downloading nodes have enough information to reconstruct the original file may be calculated. In other words, the number of rounds until the upload-complete state is reached may be calculated. As used herein, "round" refers to C uploads performed by any node. Because an individual node can upload to C different other nodes simultaneously, each round refers to C uploads. Note that not all of these C uploads in a single round might necessarily be uploading different chunks. Because the original data has k chunks, it may take at least $\lceil k/C \rceil$ rounds of uploads to reach upload-complete. Thus, it may be useful to calculate the probability that upload-complete is achieved after $\lceil k/C \rceil$ rounds.

The present disclosure contemplates that, in an example P2P network with network coding, each time a node uploads information, it may send a linear combination of chunks to the downloader. The linear combination may be done in the binary base (modulo 2). Using the 10-chunk example discussed above, if the uploader is sending a linear combination of chunks $k_2$, $k_5$, and $k_{10}$, then it may send $k_2 \oplus k_5 \oplus k_{10}$ along with a binary coefficient vector [0 1 0 0 1 0 0 0 0 1] (the $2^{nd}$, $5^{th}$ and $10^{th}$ elements are 1, and others 0). Here, the operator $\oplus$ means modulo 2 addition of the entire contents of the chunks. A node may have complete information to reconstruct the original data once it has collected ten linearly-independent binary coefficient vectors. This means these ten vectors can form a matrix whose rank=10 in the binary space.

Returning to the situation of given a k-chunk original file, and each time the simultaneous uploads is C, the question of what is the probability that "upload-complete" is reached after $\lceil k/C \rceil$ rounds of uploads may be asked.

The present disclosure contemplates that, in a simple case, k=m×C, where m is a positive integer. Therefore, $\lceil k/C \rceil$=m and m×C=k. In this case, after m rounds of uploads from the source node, there may be k linear combinations—or k vectors—that have been downloaded by the downloading nodes. If these k vectors are all linearly independent in the binary space, then upload-complete may be reached. Thus, the question may be restated as what is the probability that k random vectors (size 1×k, binary) can form a full-ranked k×k matrix in the binary space.

The present disclosure contemplates that, to analyze this problem, the following facts may be considered:
1. The total number of possible linear combinations is $2^k-1$. Since only the binary space is considered, the coefficients (vector) of any linear combination are either one or zero. Excluding the zero vector, there are $2^k-1$ possible linear combinations (vectors).

2. For k vectors to form a full-ranked k×k matrix in the binary space, each vector may be linearly independent from the other vector. Thus, for the jth vector to be linearly independent, it may not fall into the vector space spanned by the previous j−1 vectors. This leaves $(2^k-1)-(2^{j-1}-1)=2^k-2^{j-1}$ possibilities for the jth vector.

The present disclosure contemplates that, therefore, the probability that k randomly selected nonzero binary vectors can form a full-ranked k×k matrix is given by Expression (1).

$$(2^k-1)^{-(k-1)} \prod_{j=1}^{k-1} (2^k - 2^j) \quad (1)$$

The present disclosure contemplates that, next, a more generic case when k is not a multiple of C, e.g., k=m×C+a, where m and a are positive integers and a<C, may be considered. This case may become more complex since (m+1)×C linear combinations have been uploaded after ⌈k/C⌉=m+1 rounds of uploads. That means there can be (C−a) vectors which are not linearly independent. The probability that (m+1)×C vectors form a k-ranked (m+1)×C by k matrix may be given by Expression (2).

$$\frac{\prod_{i=1}^{k-1} (2^k - 2^i)}{(2^k - 1)^{(m+1)C - 1}} \cdot \left[ \sum_{j_1=1}^{k} \sum_{j_2=1}^{j_1} \cdots \sum_{j_{C-a}=1}^{j_{C-a-1}} (2^{j_1} - 1)(2^{j_2} - 1) \cdots (2^{j_{C-a}} - 1) \right] \quad (2)$$

Considering Expression (2), (C−a)=1 may be taken as an example. It may be desirable to determine whether, among these (m+1)×C vectors, one can be linearly dependent from its predecessors. The probability that the jth vector is linearly dependent with the previous (j−1) vectors is $(2^{j-1}-1)/(2^k-1)$, and the j can vary from 2 to (m+1)×C.

$$\sum_{j=2}^{(m+1)C} (2^{j-1} - 1)/(2^k - 1) = \sum_{j=1}^{(m+1)C-1} (2^j - 1)/(2^k - 1) \quad (2a)$$

$$= \sum_{j=1}^{mC+C-1} (2^j - 1)/(2^k - 1)$$

$$= \sum_{j=1}^{mC+a} (2^j - 1)/(2^k - 1) \quad (\because C - a = 1)$$

$$= \sum_{j=1}^{k} (2^j - 1)/(2^k - 1),$$

This may explain the summations in Expression (2). Notably, Expression (2a) can have a value greater than 1, since this expression itself may not represent any probability. Its value may be multiplied by the probability that all other vectors are linearly independent.

The present disclosure contemplates that an analysis of some P2P networks may begin with a simple case where k=m×C. For all downloading nodes to be able to reconstruct the original data among themselves after m rounds of uploads, all of the m×C chunks that have been uploaded from the source node may be different from each other. As in the previous analysis, it may be assumed that the downloading nodes are aware of which chunks have been downloaded by other peers so they will not request the same chunk from the source—assuming a global-rarest-first system. However, as mentioned previously, a global-rarest-first system may not prevent two nodes from downloading the same chunk at the same time. Therefore, the cause of inefficiency lies in the situation when not all C chunks are different in one round of uploads. The probability that m×C uploads from the source will provide k distinct chunks essentially may be the probability that all C chunks being uploaded in an individual round are distinct.

The present disclosure contemplates that, for the first round's C chunks to be distinct, the probability may be given by Expression (3).

$$\frac{k!}{k^C \cdot (k-C)!} \quad (3)$$

The present disclosure contemplates that, for the second round's C chunks to be distinct, the probability may be given by Expression (4).

$$\frac{(k-C)!}{(k-C)^C \cdot (k-2C)!} \quad (4)$$

The present disclosure contemplates that, since there are m rounds of uploads, the probability that all uploads thus far are distinct (hence upload-complete) may be given by Expression (5).

$$\left[ k! \cdot \prod_{i=0}^{m} \frac{1}{(k - i \cdot C)^C} \right] \quad (5)$$

The present disclosure contemplates that, next, a more generic case where k is not a multiple of C, e.g., k=m×C+a, where m and a are positive integers and a<C, may be considered. It may be more difficult to formulate the probability that all k chunks have been uploaded by the source node after (m+1) rounds of uploads, as C−a uploaded chunks among all (m+1)×C uploads may be the same as any of their predecessors and the probability of them being the same as their predecessors may change from round to round. Therefore, this analysis may provide a loose upper bound for this probability.

It may be assumed that it is probable that the first (m−1) rounds of uploads, these (m−1)×C uploaded chunks, may be distinct from each other. Therefore, the analysis may focus on the last two rounds of uploads. Thus, it may be desirable to determine, with C+a chunks not yet uploaded, the probability that all of these chunks will be uploaded in the next two rounds of uploads. This can be formulated by using the same logic, as given by Expression (6).

$$\sum_{n=0}^{C-a} \left\{ \left[ \frac{(C-a)!}{(C+a)^C (C+n)!} \cdot \sum_{i_1=1}^{C-n} \sum_{i_2=1}^{i_1} \cdots \sum_{i_n=1}^{i_{n-1}} i_1 \times i_2 \times \ldots \times i_n \right] \right\}. \quad (6)$$

$$\left[\frac{(a+n)!}{(a+n)^C} \cdot \sum_{i_1=1}^{a+n} \sum_{i_2=1}^{i_1} \cdots \sum_{i_{C-a-n}=1}^{i_{C-a-n-1}} i_1 \times i_2 \times \ldots \times i_n\right]\Bigg\}$$

The present disclosure contemplates that, to understand how Expression (6) is derived, a simple example when C=4 and a=2 may be considered. The loose upper-bound may assume the first (m−1) rounds of uploads all contain distinct chunks, and, therefore, after (m−1) rounds there are C+a=4+2=6 chunks from the original data yet to be uploaded. Thus, in order to have all remaining 6 chunks uploaded in the next two rounds, one of the following may be true:
1. The m-th round includes 4 distinct chunks (4 distinct out of 4 total), and the (m+1)-th round includes 2 distinct chunks (2 distinct out of 4 total);
2. The m-th round includes 3 distinct chunks, and the (m+1)-th round includes 3 distinct chunks; or
3. The m-th round includes 2 distinct chunks, and the (m+1)-th round includes 4 distinct chunks.

The index n in Expression (6) may represent "the number of non-distinct chunks in the m-th round."

Figure 3:
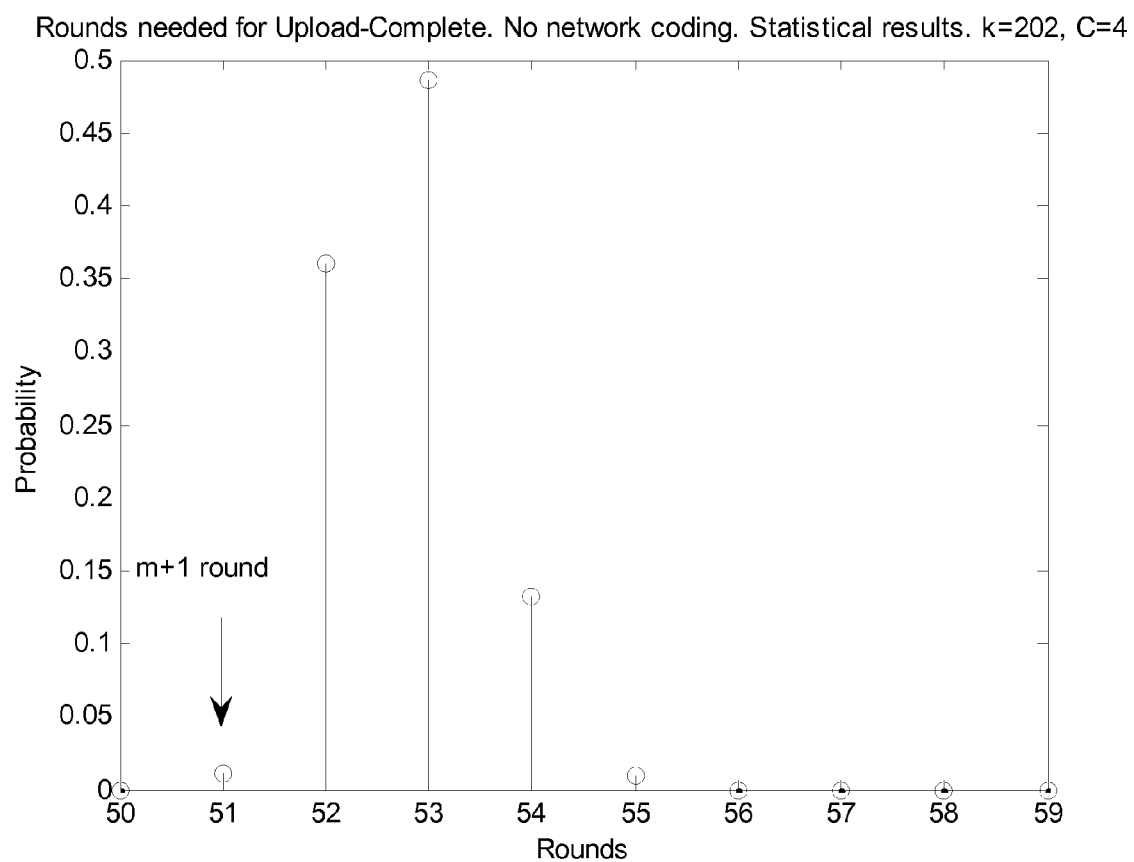
FIG. 3 is a plot of probability versus number of rounds to reach upload complete in an example peer-to-peer network with no network coding.
Figure 4:
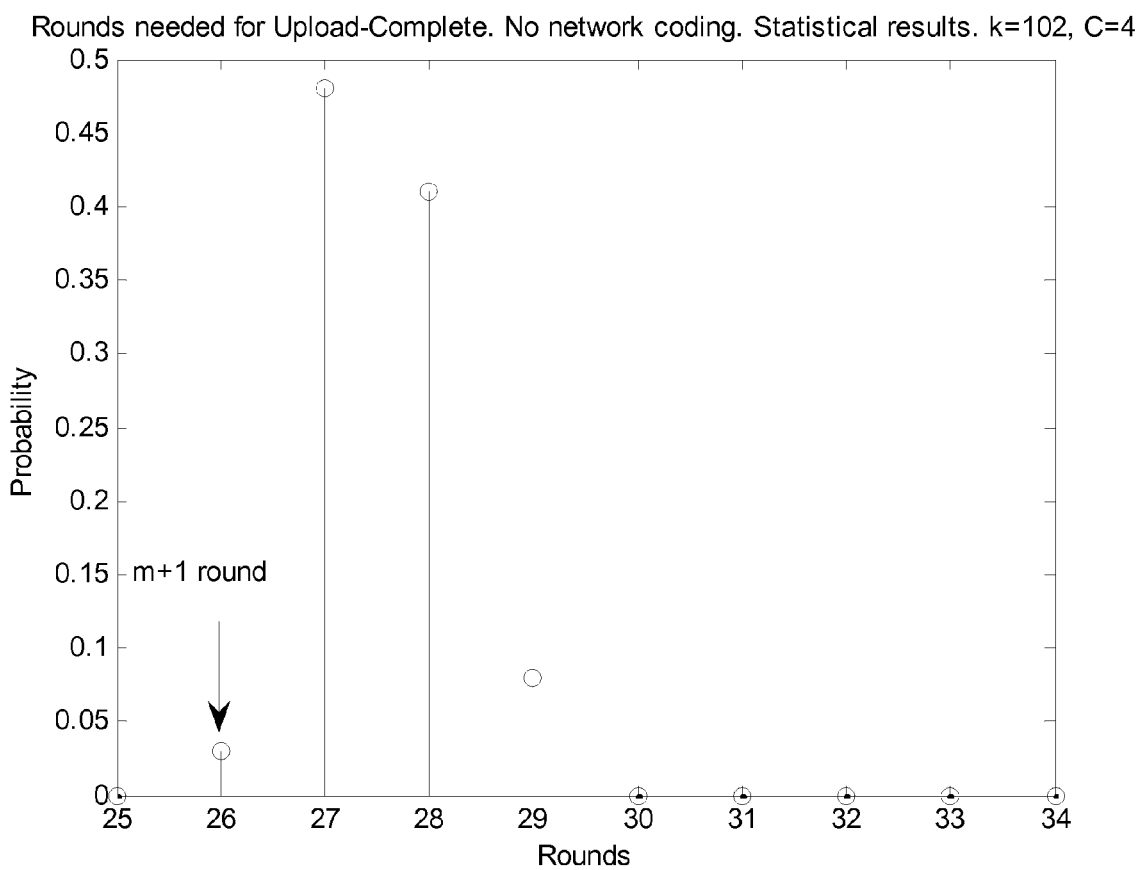
FIG. 4 is a plot of probability versus rounds utilized to reach upload complete in an example peer-to-peer network with no network coding.

FIGS. 3 and 4 are plots of probability versus number of rounds to reach upload complete in an example peer-to-peer network with no network coding. The present disclosure contemplates that FIGS. 3 and 4 illustrate the probability that upload-complete is reached at the x-th round. These figures depict the statistical results obtained from the same mathematical model: the chunks that have been uploaded in the previous rounds will not be uploaded again, but within an individual round there can be non-distinct chunks uploaded. It is apparent that the probability to reach upload-complete at the (m+1)-th round is low. In some cases, it takes about (m+2) to (m+4) rounds to reach upload-complete.

The present disclosure contemplates that the performance of networks employing network coding may be compared with the performance of networks not employing network coding. For the simple case of k=m×C, Expressions (1) and (5) are compared. Expression (1) converges to approximately 28% as k becomes large. The value of Expression (5) depends on C; if C=4 is picked (as in the common BitTorrent protocol), Expression (5) approaches zero when k becomes large. Interestingly, if C=1, Expression (5)=1, regardless of k. This follows because C=1 indicates that there is only one chunk uploaded in an individual round from the source. Thus, there may be no chance that two nodes would download the same chunk at the same time.

The present disclosure contemplates that, however, in a practical network, even with C set to be 1, it cannot be guaranteed that two different nodes would not request the same chunk to download from the source node. For instance, a node A is downloading chunk x from node B at time t. Meanwhile, node C has made a request to node B for chunk x. At the next moment t2, B will have forwarded chunk x to A. At this moment, node C should realize that A has already obtained chunk x, and, therefore, chunk x is no longer the rarest piece. Accordingly, C should withdraw the request from B. However, if B starts to upload to C before C has made this discovery, then the upload would still occur. In some cases, as long as there is a chance that two nodes would be downloading the same chunk from the source, Expression (5) approaches zero when k is large.

The present disclosure contemplates that, for the generic case, Expressions (2) and (6) may be compared. When k is large (>100), the value of Expression (2) only depends on the values of a and C. For illustrative purposes, it is assumed that C=4 and the effect of a is considered. When a=1, Expression (2) is about 88%; when a=2, it is about 77%; and when a=3, it is at 57%. The reason the smaller a yields higher probability of upload-complete is that with a fixed C, when C−a is larger (smaller a), there is a greater chance that uploads are linearly-independent, and, therefore, the chance of upload-complete is higher. For Expression (6), since it is a loose upper bound, its value also only depends on a and C. Again, if C=4, when a=1, Expression (6) yields 30%; when a=2, it is 21%; and when a=3, it decreases to 9.5%. From these analytical results, it is clear that network coding can improve the performance of P2P file sharing networks.

The present disclosure contemplates that in some network coding algorithms (including those utilized in networks other than P2P networks), the encoding is done by the sending nodes. It has been shown, through simulations/experiments, that by applying random linear network coding in a P2P network, the efficiency can be improved. It has also been shown that network coding in all nodes provides better performance than coding only at the source node, which is consistent with the analyses described above. Because network coding improves the efficiency of a downloading node in distributing its data to peers just as it does for a source node, implementing network coding in all nodes may yield better overall network performance.

The present disclosure contemplates that when network coding is carried out in the sending nodes, there is a possibility that even though a node A has information sought by another node B, after random linear combination by node A, the result might no longer be what node B needs.

The present disclosure contemplates that, to illustrate this point, one of the models discussed above may be considered: Consider node A and node B, both of which are downloading nodes in a P2P network with network coding. At some point during the transmission, node A has received two linear combinations, e.g., two vectors $v_1^A$=[1 1 0 0 1] and $v_2^A$=[1 0 1 1 0] (original data=5 chunks), and node B has received one vector $v_1^B$=[0 1 1 1 1]. At this point, node B can benefit by downloading either of the two vectors node A has because either $v_1^A$ or $v_2^A$ is linearly independent of $v_1^B$. However, because of random network coding, node A might decide to distribute $v_1^A \oplus v_2^A$ instead. In such case, node B will not consider node A as having useful information (since $v_1^A \oplus v_2^A = v_1^B$) and node B will not download from node A, thus causing a missed opportunity for downloading. As used herein, this situation may be referred to as the "unlucky combination." Although the unlucky combination may occur only rarely and a P2P network with network coding may outperform some other P2P networks without coding, the unlucky combination may occur frequently enough that network performance can be significantly improved by avoiding the unlucky combination. The amount of improvement depends on the ratio of the neighborhood size and the original data size: the smaller the neighborhood and the larger the original data, the greater the improvement.

Employing an example DRLNC algorithm may eliminate the unlucky combination problem. An example DRLNC may be based at least in part on the following rules, all or any of which may or may not be utilized in other example embodiments:
1. The original data is chopped into k chunks, which may be of equal size. The larger the original data, the larger the k.
2. Each time an upload occurs, a linear combination (modulo 2) of the k chunks is sent to the downloader.

3. Along with the linear combination, a coefficient vector is also sent to the downloader which tells the downloader the linear combination it is receiving.
4. A downloading node keeps a coefficient matrix of which the rows correspond to the coefficient vectors that it has received.
5. The coefficient matrix at the source node is a k×k identity matrix.
6. A downloading node is aware of the current coefficient matrices of its neighbor nodes.
7. When a downloading node requests data from its neighbor node, it randomly picks a linear combination among those that carry useful information, and requests such combination explicitly from this neighbor node.
8. When a downloading node receives enough information such that its coefficient matrix has a rank of k, it then reconstructs the original data, and changes its coefficient matrix to a k×k identity matrix like the source node.

Point number seven above may eliminate the unlucky combination situation.

To further explain point six above, an example follows. Node A currently has the coefficient matrix:

$$M_A = \begin{pmatrix} 1 & 0 & 1 & 1 & 0 \\ 1 & 1 & 0 & 0 & 1 \\ 0 & 0 & 0 & 1 & 1 \\ 1 & 0 & 0 & 0 & 1 \end{pmatrix}$$

Node B currently has the coefficient matrix:

$$M_B = \begin{pmatrix} 1 & 1 & 0 & 1 & 0 \\ 0 & 1 & 1 & 0 & 0 \end{pmatrix}$$

Node B sees node A's matrix ($M_A$) and sees it can increase the rank of its own matrix ($M_B$) by downloading either the $2^{nd}$, $3^{rd}$, or $4^{th}$ row from $M_A$. However, node B also sees that if it downloads a linear combination of row 2 and row 3 from $M_A$, it will not improve the rank of $M_B$. Therefore, node B may randomly select a linear combination of row 2, 3, and 4, but exclude the combination of rows 2⊕3. Node B then may explicitly requests node A to upload the selected combination. For example, if node B chooses a linear combination of rows 3⊕4, it may send a request to node A asking node A to send the linear combination of row 3 and row 4 in A's matrix to B.

An example DRLNC algorithm may call for some computational overhead in the downloading nodes. However, the extra computation is simply the calculation of the rank of a binary matrix in the binary space. The benefits of this extra computation can be significant as discussed below.

Figure 5:
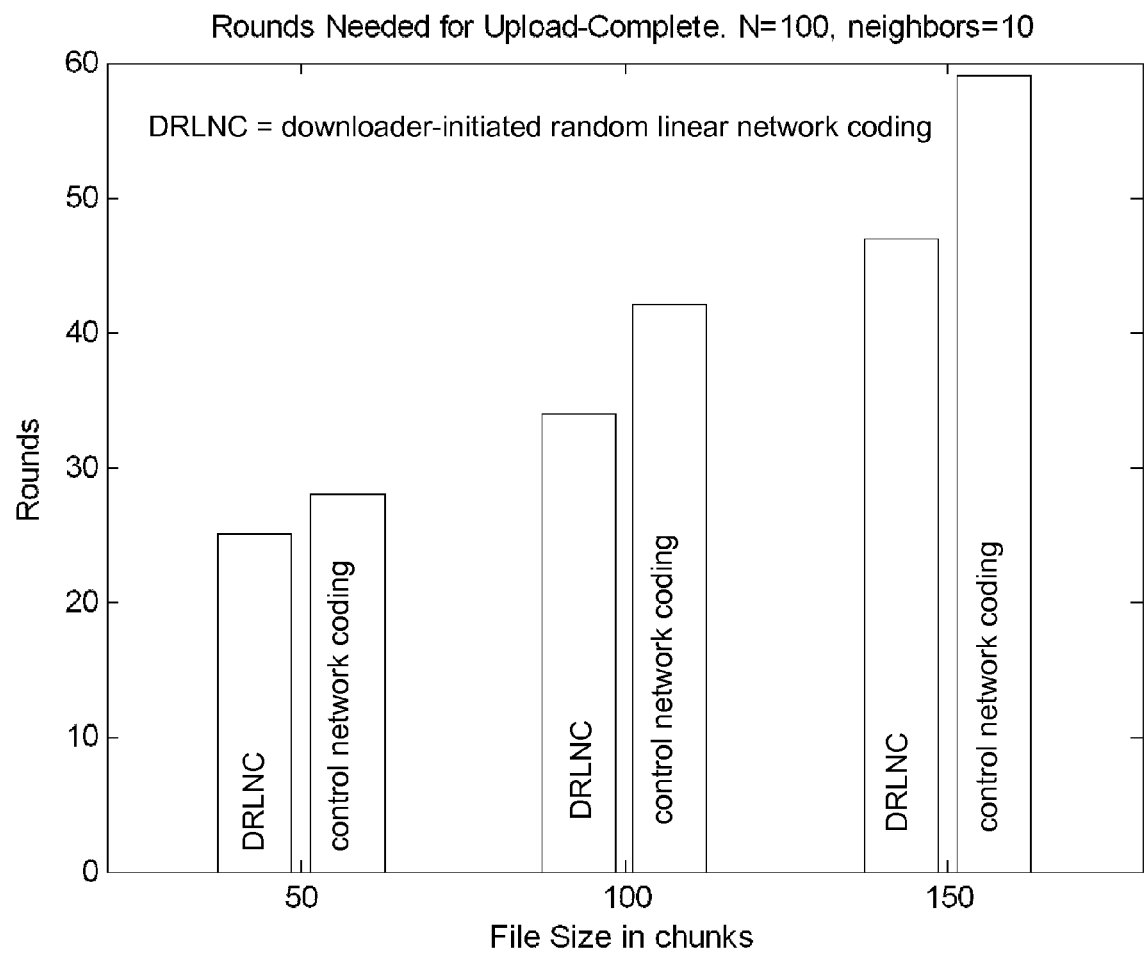
FIG. 5 is a plot that illustrates how many rounds of uploads may be utilized to reach upload complete for both control network coding and downloader-initiated random linear network coding.

The performance of an example DRLNC algorithm may be compared with the performance of control network coding where the random linear coding is determined at the uploading nodes. FIG. 5 is a plot that illustrates how many rounds of uploads may be utilized to achieve upload-complete for both control network coding and downloader-initiated random linear network coding. A network with 100 nodes, a neighborhood size of 10 nodes, and the allowed number of simultaneous uploads of 4 (C=4) is assumed. The performance of the network is evaluated with various original data sizes, set here as 50, 100, and 150 chunks. As is apparent, downloader-initiated random linear network coding may utilize fewer rounds to achieve upload-complete than control network coding. The difference is more significant when the original size is larger—as stated earlier, the larger the original data size, the greater improvement provided by downloader-initiated random linear network coding.

Figure 6:
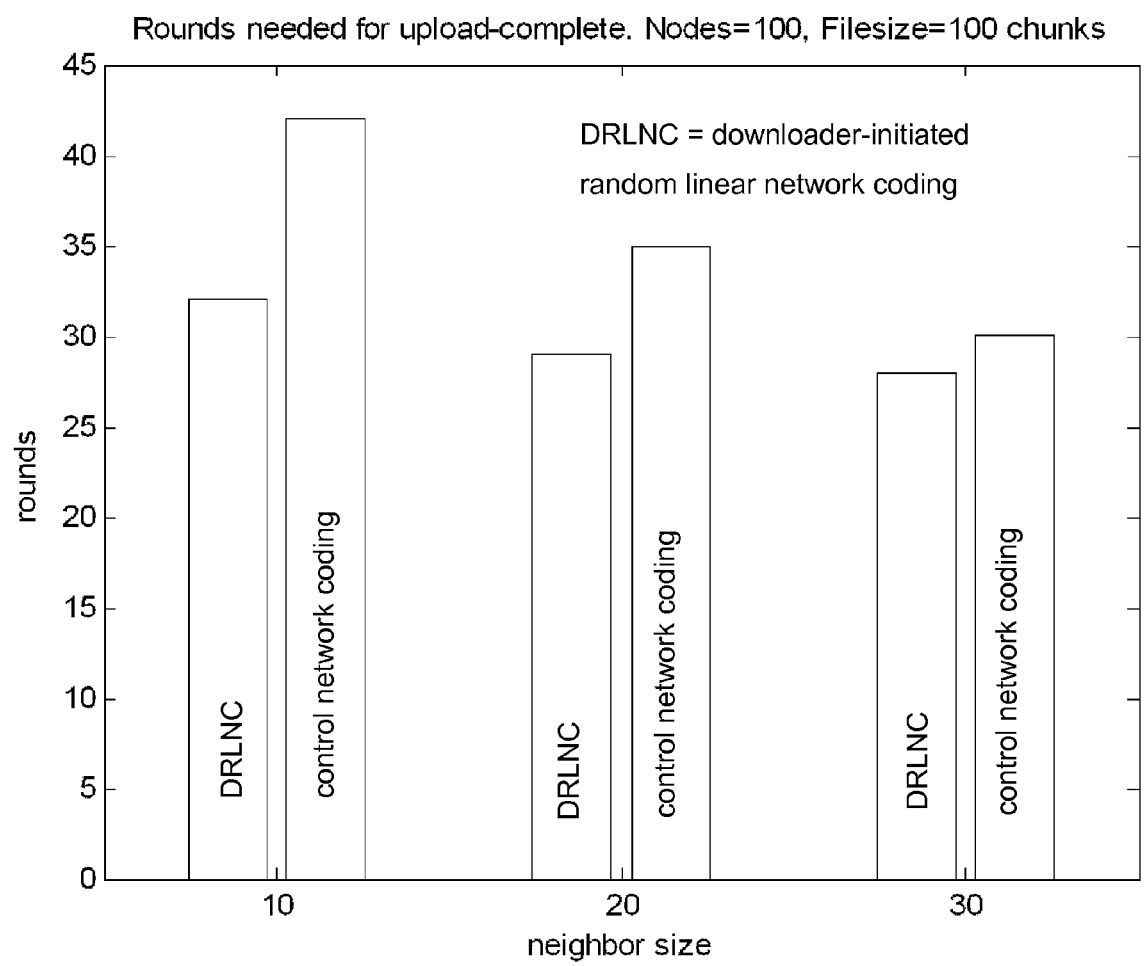
FIG. 6 is a plot that illustrates how neighborhood size influences the performance of the network.

FIG. 6 is a plot that illustrates how neighborhood size influences the performance of the network. With control network coding, the performances vary according to the neighborhood size more than downloader-initiated random linear network coding. Here, the network may include 100 nodes with the original data size of 100 chunks, C=4, and the neighborhood size varies from 10 to 30. As is apparent from FIG. 5, the number of rounds that may be utilized to achieve upload-complete remains approximately the same regardless of the neighborhood size for downloader-initiated random linear network coding, while the number of rounds that may be utilized to achieve upload-complete may be larger for control network coding when the neighborhood size is small.

Figure 7:
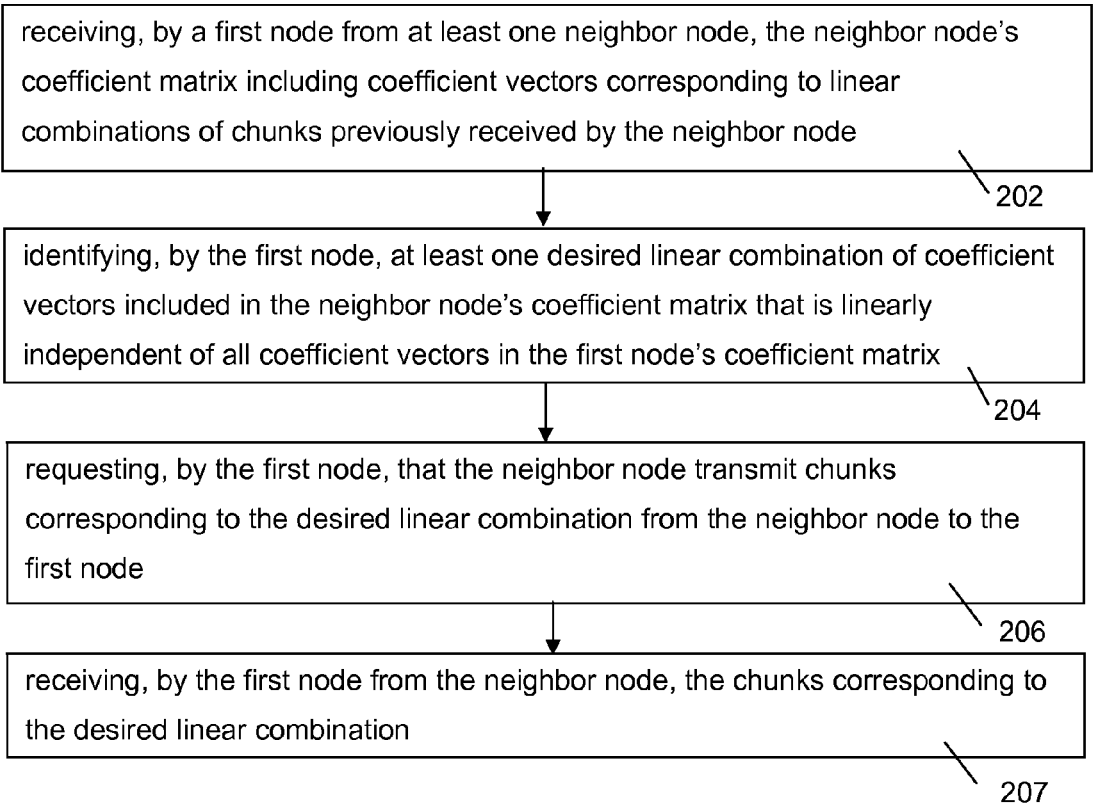
FIG. 7 is a flowchart depicting the operation of an example downloader-initiated random linear network coding method.

FIG. 7 is a flowchart depicting the operation of an example downloader-initiated random linear network coding method, in accordance with the present disclosure. An original data can be transferred among a plurality of nodes on a network, where the original data may include N chunks $k_i$, where i may be an integer between 1 and N, where the chunks $k_i$ may be transmitted as linear combinations of chunks $k_i$, and where a coefficient vector including N binary elements corresponding to the chunks $k_i$ may accompany an individual linear combination. Operation 202 includes receiving, by a first node from at least one neighbor node, the neighbor node's coefficient matrix including coefficient vectors corresponding to linear combinations of chunks previously received by the neighbor node. Operation 204 includes identifying, by the first node, at least one desired linear combination of coefficient vectors included in the neighbor node's coefficient matrix that is linearly independent of all coefficient vectors in the first node's coefficient matrix. Operation 206 includes requesting, by the first node, that the neighbor node transmit chunks corresponding to the desired linear combination from the neighbor node to the first node. Operation 207 includes receiving, by the first node from the neighbor node, the chunks corresponding to the desired linear combination.

FIG. 8 is a flowchart depicting the operation of an example downloader-initiated random linear network coding method, in accordance with the present disclosure. An original data can be transferred among a plurality of nodes on a network, where the original data may include N chunks $k_i$, where i may be a integer between 1 and N, where the chunks $k_i$ may be transmitted as linear combinations of chunks $k_i$, and where a coefficient vector including N binary elements corresponding to the chunks $k_i$ may accompany an individual linear combination. Operation 208 includes transmitting, by a first node to at least one neighbor node, a coefficient matrix including coefficient vectors corresponding to linear combinations of chunks previously received by the first node. Operation 210 includes receiving, by the first node, from the neighbor node, a request corresponding to a desired linear combination of chunks corresponding to a linear combination of coefficient vectors in the first node's coefficient matrix. Operation 212 includes transmitting, from the first node to the second node, the desired linear combination of chunks.

FIG. 9 is a flowchart depicting the operation of an example downloader-initiated random linear network coding method, in accordance with the present disclosure. Data can be transferred between nodes in a network. Operation 220 includes transmitting, by a first node to a second node, a coefficient matrix including a plurality of coefficient vectors associated with chunks of an original data held by the first node. Operation 222 includes identifying, by the second node, a desired linear combination by randomly selecting from among a plurality of linear combinations of coefficient vectors in the coefficient matrix that are linearly independent from the vectors in the coefficient matrix of the second node. Operation 224 includes requesting, by the second node, that the first node transmit the chunks associated with the desired linear combination. Operation 226 includes transmitting, by the first node to the second node, the chunks associated with the desired linear combination and a coefficient vector associated with the desired linear combination.

Figure 10:
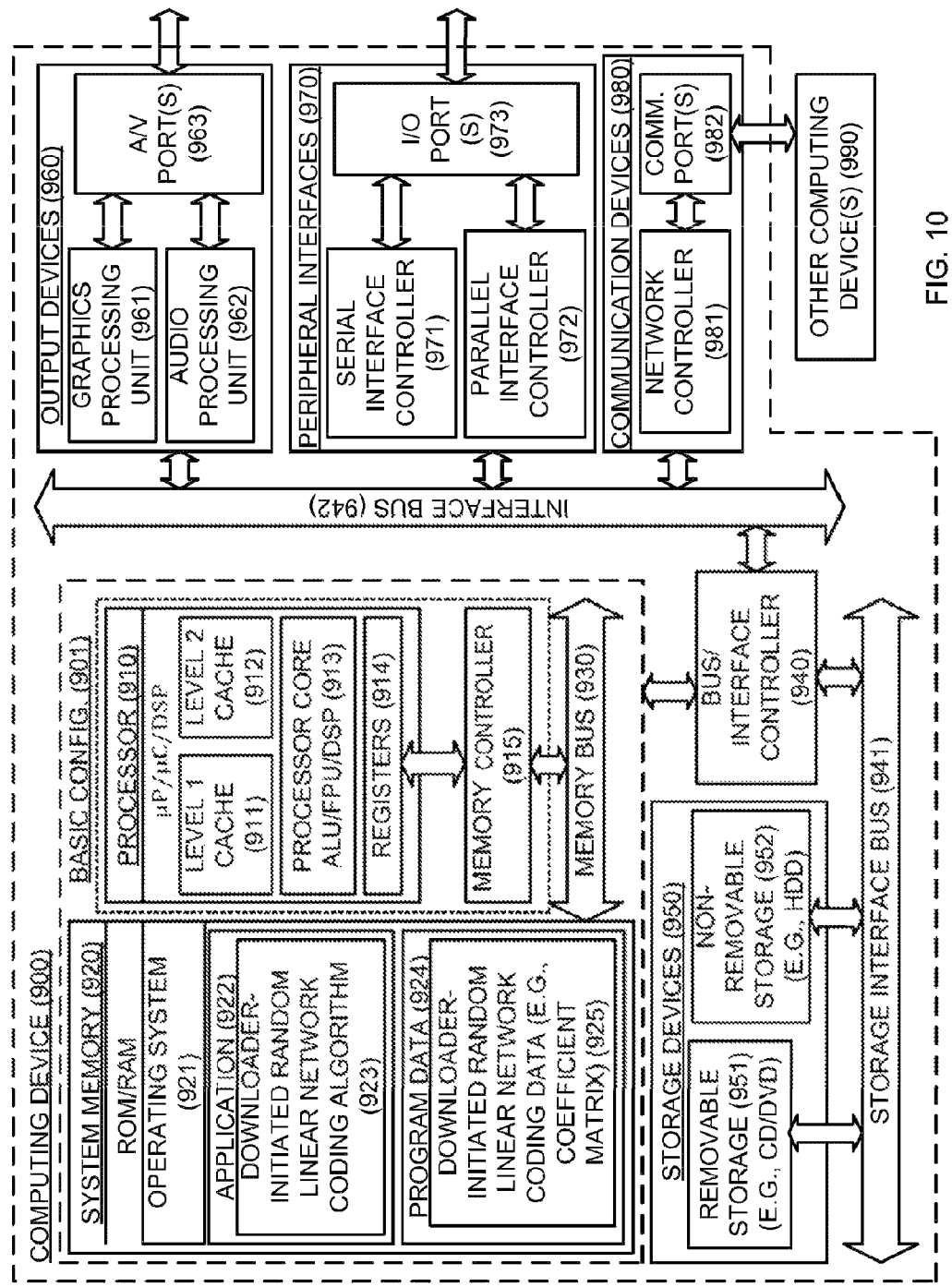
FIG. 10 is a schematic diagram of an example computer device that is arranged for downloader-initiated random linear network coding, all arranged in accordance with at least some embodiments of the present disclosure.

FIG. 10 is a schematic diagram of an example computing device 900 that is arranged for downloader-initiated random linear network coding in accordance with the present disclosure. In a very basic configuration 901, computing device 900 typically includes one or more processors 910 and system memory 920. A memory bus 930 can be used for communicating between the processor 910 and the system memory 920.

Depending on the desired configuration, processor 910 can be of any type including but not limited to a microprocessor (μP), a microcontroller (μC), a digital signal processor (DSP), or any combination thereof. Processor 910 can include one more levels of caching, such as a level one cache 911 and a level two cache 912, a processor core 913, and registers 914. The processor core 913 can include an arithmetic logic unit (ALU), a floating point unit (FPU), a digital signal processing core (DSP Core), or any combination thereof. A memory controller 915 can also be used with the processor 910, or in some implementations the memory controller 915 can be an internal part of the processor 910.

Depending on the desired configuration, the system memory 920 can be of any type including but not limited to volatile memory (such as RAM), non-volatile memory (such as ROM, flash memory, etc.) or any combination thereof. System memory 920 typically includes an operating system 921, one or more applications 922, and program data 924. Application 922 includes a downloader-initiated random linear network coding algorithm 923 that is arranged to implement downloader-initiated random linear network coding on a network. Program Data 924 includes recursive downloader-initiated random linear network coding data 925 (such as one or more coefficient matrices, one or more coefficient vectors, one or more data chunks, etc.) that is useful for downloader-initiated random linear network coding as described herein. In some embodiments, application 922 can be arranged to operate with program data 924 on an operating system 921 such that downloader-initiated random linear network coding may be implemented. For example, the operations described above with reference to FIGS. 7-9 may be performed by application 922 using program data 924 on operating system 921.

The described basic configuration is illustrated in FIG. 9 by those components within dashed line 901. Computing device 900 can have additional features or functionality, and additional interfaces to facilitate communications between the basic configuration 901 and any required devices and interfaces. For example, a bus/interface controller 940 can be used to facilitate communications between the basic configuration 901 and one or more data storage devices 950 via a storage interface bus 941. The data storage devices 950 can be removable storage devices 951, non-removable storage devices 952, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data.

System memory 920, removable storage 951 and non-removable storage 952 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 900. Any such computer storage media can be part of computing device 900.

Computing device 900 can also include an interface bus 942 for facilitating communication from various interface devices (e.g., output interfaces, peripheral interfaces, and communication interfaces) to the basic configuration 901 via the bus/interface controller 940. Example output devices 960 include a graphics processing unit 961 and an audio processing unit 962, which can be configured to communicate to various external devices such as a display or speakers via one or more A/V ports 963. Example peripheral interfaces 970 include a serial interface controller 971 or a parallel interface controller 972, which can be configured to communicate with external devices such as input devices (e.g., keyboard, mouse, pen, voice input device, touch input device, etc.) or other peripheral devices (e.g., printer, scanner, etc.) via one or more I/O ports 973. An example communication device 980 includes a network controller 981, which can be arranged to facilitate communications with one or more other computing devices 990 over a network communication via one or more communication ports 982. The communication connection is one example of a communication media. Communication media may typically be embodied by computer readable instructions, data structures, program modules, or other data in a modulated data signal, such as a carrier wave or other transport mechanism, and includes any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media. The term computer readable media as used herein can include both storage media and communication media.

Computing device 900 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 900 can also be implemented as a personal computer including both laptop computer and non-laptop computer configurations.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or"an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method to transfer an original data among nodes on a network, the method comprising:
   receiving, by a first node from at least one neighbor node, a coefficient matrix associated with the neighbor node, the coefficient matrix including coefficient vectors corresponding to linear combinations of chunks previously received by the neighbor node, where the chunks are associated with the original data including N chunks $k_i$, where i is a integer between 1 and N, where the chunks $k_i$ are transmitted as linear combinations of chunks k, and where the coefficient vectors accompany respective individual linear combinations and include N binary elements corresponding to the chunks $k_i$ which are associated with the respective individual linear combinations;
   identifying, by the first node, at least one particular linear combination of coefficient vectors included in the coefficient matrix associated with the neighbor node that is linearly independent of coefficient vectors in coefficient matrix associated with the first node, wherein the coefficient vectors included in the coefficient matrix associated with the neighbor node include information utilized to acquire the original data;
   requesting, by the first node, that the neighbor node transmit N chunks of the original data corresponding to the particular linear combination from the neighbor node to the first node;
   receiving, by the first node from the neighbor node, the N chunks of the original data corresponding to the particular linear combination, wherein the N chunks of the original data have a rank of k;
   identifying, at the first node, an upload-complete state of a transfer of the original data from the neighbor node to the first node, wherein the upload-complete state of the transfer is determined by a calculation of the chunks $k_i$ of the original data divided by a number of uploads performed by the neighbor node where each round of the uploads refers to C uploads, ($k_i$/C); and
   in response to an identification of the upload-complete state of the transfer, exchanging, between the first node and a second node, the information from the coefficient vectors included in the coefficient matrix associated with the neighbor node to reconstruct the original data.

2. The method of claim 1, wherein the chunks are equally sized portions of the original data.

3. The method of claim 1, wherein identifying at least one particular linear combination comprises randomly selecting one particular linear combination from among linearly independent linear combinations of the coefficient vectors in the coefficient matrix associated with the neighbor node.

4. The method of claim 3, wherein randomly selecting one particular linear combination comprises randomly selecting the one particular linear combination from among the linearly independent linear combinations of the coefficient vectors in the coefficient matrix associated with the neighbor node that are linearly independent from the coefficient vectors in the coefficient matrix associated with the first node.

5. The method of claim 1, further comprising, after the receiving of the N chunks, repeating the receiving the coefficient matrix associated with the neighbor node, identifying at least one further linear combination of the coefficient vectors, requesting that the neighbor node transmit chunks corresponding to the further linear combination, and receiving the chunks for the further linear combination.

6. The method of claim 1, further comprising, after receiving the N chunks corresponding to the particular linear combination, transmitting, by the first node to the neighbor node, an updated coefficient matrix including other coefficient vectors corresponding to the particular linear combination.

7. The method of claim 1, wherein receiving the coefficient matrix associated with the neighbor node includes receiving coefficient matrices from neighbor nodes.

8. The method of claim 1, wherein receiving the N chunks corresponding to the particular linear combination includes receiving the coefficient vectors reflecting the received N chunks.

9. The method of claim 1, further comprising after receiving the N chunks corresponding to the particular linear combination, if the first node has received the N chunks of data comprising the original data, changing the coefficient matrix associated with the first node to a k×k identity matrix.

10. A method to transfer an original data among nodes on a network, the method comprising:
    transmitting, by a first node to at least one neighbor node, a first coefficient matrix including coefficient vectors corresponding to linear combinations of chunks previously received by the first node, where the chunks are associated with the original data including N chunks k, where i is a integer between 1 and N, where the chunks $k_i$ are transmitted as linear combinations of chunks $k_i$, and where the coefficient vectors accompany respective individual linear combinations and include N binary elements corresponding to the chunks $k_i$ which are associated with the respective individual linear combinations;
    identifying, by the at least one neighbor node, at least one particular linear combination of coefficient vectors included in the first coefficient matrix that is linearly independent of coefficient vectors in a second coefficient matrix associated with the at least one neighbor node, wherein the coefficient vectors included in the first coefficient matrix include information utilized to acquire the original data;
    receiving, by the first node, from the at least one neighbor node, a request corresponding to N chunks of original data corresponding to the at least one particular linear combination;
    transmitting, from the first node to the at least one neighbor node, the N chunks of the original data corresponding to the at least one particular linear combination, wherein the N chunks of the original data have a rank of k;

identifying, at the at least one neighbor node, an upload-complete state of a transfer of the original data from the first node to the at least one neighbor node, wherein the upload-complete state of the transfer is determined by a calculation of the chunks $k_i$ of the original data divided by a number of uploads performed by the at least one neighbor node where each round of the uploads refers to C uploads, ($k_i/C$); and in response to an identification of the upload-complete state of the transfer, exchanging, between the at least one neighbor node and a second node, the information in the coefficient vectors included in the second coefficient matrix associated with the at least one neighbor node to reconstruct the original data.

11. The method of claim 10, wherein the chunks are equally sized portions of the original data.

12. The method of claim 10, wherein the particular linear combination was randomly selected from among linear combinations of the coefficient vectors in the first coefficient matrix that are linearly independent of the coefficient vectors associated with the second coefficient matrix associated with the at least one neighbor node.

13. The method of claim 10, further comprising, after transmitting, from the first node to the at least one neighbor node, the N chunks of the original data corresponding to the particular linear combination, receiving, by the first node from the at least one neighbor node, an updated coefficient matrix associated with the neighbor node, the updated coefficient matrix including other coefficient vectors corresponding to the particular linear combination.

14. The method of claim 10, wherein transmitting the first coefficient matrix includes transmitting the first coefficient matrix to neighbor nodes.

15. The method of claim 10, further comprising, after transmitting, from the first node to the at least one neighbor node, the N chunks of the original data corresponding to the particular linear combination, transmitting the particular linear combination for a second linear combination of coefficient vectors.

16. The method of claim 10, wherein transmitting, from the first node to the at least one neighbor node, the N chunks of the original data corresponding to the particular linear combination includes transmitting, from the first node to the second node, the coefficient vectors reflecting the transmitted N chunks of the original data.

17. The method of claim 10, further comprising, after transmitting, from the first node to the at least one neighbor node, the N chunks of the original data corresponding to the particular linear combination, if the second node has received the N chunks comprising the original data, receiving, by the first node from the second node, an updated coefficient matrix associated with the second node and comprising a k×k identity matrix.

18. An apparatus comprising:

a first node in a network configured to communicate with a second node in the network, where the first node is further configured to:

receive, from the second node, a coefficient matrix associated with the second node, the coefficient matrix including coefficient vectors associated with chunks of an original data held by the second node, wherein the coefficient vectors include information utilized to acquire the original data;

identify a particular linear combination by random selection of the particular linear combination from among linear combinations of the coefficient vectors in the coefficient matrix associated with the second node that are linearly independent from coefficient vectors in a coefficient matrix associated with the first node;

request that the second node transmit chunks of the original data associated with the particular linear combination;

receive, from the second node, the chunks of the original data associated with the particular linear combination and coefficient vectors associated with the particular linear combination;

identify an upload-complete state of a transfer of the original data from the second node, wherein the upload-complete state of the transfer is determined by a calculation of chunks $k_i$ of the original data divided by a number of uploads performed by the first node where each round of the uploads refers to C uploads, ($k_i/C$); and in response to an identification of the upload-complete state of the transfer, exchange, with a neighbor node, the information in the coefficient vectors to reconstruct the original data.

19. The apparatus of claim 18, wherein the second node is configured to separate the original data into chunks.

20. The apparatus of claim 18, wherein the first node and the second node are peer nodes on a peer-to-peer network.

* * * * *